United States Patent
Yun

(10) Patent No.: US 12,528,654 B2
(45) Date of Patent: Jan. 20, 2026

(54) ADSORPTION APPARATUS

(71) Applicant: LG Energy Solution, Ltd., Seoul (KR)

(72) Inventor: Ji Ho Yun, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/730,964

(22) PCT Filed: Jul. 11, 2023

(86) PCT No.: PCT/KR2023/009865
§ 371 (c)(1),
(2) Date: Jul. 22, 2024

(87) PCT Pub. No.: WO2024/014841
PCT Pub. Date: Jan. 18, 2024

(65) Prior Publication Data
US 2025/0100818 A1    Mar. 27, 2025

(30) Foreign Application Priority Data

Jul. 13, 2022  (KR) .......................... 10-2022-0086415

(51) Int. Cl.
*B65G 59/04*     (2006.01)
*H01M 50/211*    (2021.01)

(52) U.S. Cl.
CPC .......... *B65G 59/04* (2013.01); *B65G 2207/10* (2013.01); *B65G 2249/04* (2013.01); *H01M 50/211* (2021.01)

(58) Field of Classification Search
CPC ......... B32B 2310/028; Y10T 156/1121; Y10T 156/1922; B65G 2249/04; B65G 59/04;
(Continued)

(56) References Cited

U.S. PATENT DOCUMENTS 3,401,446 A * 9/1968 Obeda ...................... C21D 9/46
156/705
4,798,646 A * 1/1989 Sumi ................... B29C 63/0013
156/364

(Continued)

FOREIGN PATENT DOCUMENTS

DE    102005002499 A1 *  7/2006  ............. B65G 59/04
GB       2462636 A     *  2/2010  ............. B21D 43/24
(Continued)

OTHER PUBLICATIONS

International Search Report for PCT/KR2023/009865 mailed Oct. 25, 2023. 3 pages.
(Continued)

*Primary Examiner* — Gregory W Adams
(74) *Attorney, Agent, or Firm* — Lerner David LLP

(57) ABSTRACT

Disclosed herein is an adsorption device that adsorbs battery cells loaded in a loading bin and sequentially removes and transports the battery cells. The adsorption device includes a base plate capable of moving vertically and horizontally; a suction unit coupled to the base plate for adsorbing a battery cell located at a lower part of the base plate; and a push unit coupled to the base plate for striking the battery cell to produce a vibration in the battery cell adsorbed by the suction unit. The push unit includes a rod that is lifted up and down and strikes the top surface of the adsorbed battery cell to the lower end part, and the rod descends by the elastic force of a spring.

13 Claims, 18 Drawing Sheets

(58) Field of Classification Search
CPC .. B65G 2249/045; B65G 61/00; B65G 47/91; B06B 3/00; B06B 3/02; B06B 3/04
USPC ............... 294/188, 183; 156/705, 754, 73.6
See application file for complete search history.

(56) References Cited

U.S. PATENT DOCUMENTS

| | | | |
|---|---|---|---|
| 7,276,824 B2* | 10/2007 | Statnikov | C21D 7/04 310/26 |
| 7,694,957 B2* | 4/2010 | Nukada | B65H 3/62 271/146 |
| 7,792,609 B2* | 9/2010 | Strasser | B21D 43/24 271/18.1 |
| 7,802,785 B2* | 9/2010 | Kobayashi | B65H 7/02 271/146 |
| 7,891,655 B2* | 2/2011 | Williams | B65H 3/0816 271/106 |
| 8,353,442 B2* | 1/2013 | Nakai | H01L 24/75 228/1.1 |
| 10,322,890 B2* | 6/2019 | Golovashchenko | B25J 15/0616 |
| 2007/0273080 A1* | 11/2007 | Toya | B65H 3/62 271/146 |
| 2020/0122341 A1* | 4/2020 | Leonardi | B21D 43/24 |

FOREIGN PATENT DOCUMENTS

| | | | |
|---|---|---|---|
| JP | H08104442 A | 4/1996 | |
| JP | H11-7965 A | 1/1999 | |
| JP | 2001114434 A | 4/2001 | |
| JP | 2007145567 A * | 6/2007 | ............... B65G 3/62 |
| JP | 2010-102871 A | 5/2010 | |
| JP | 2012040657 A | 3/2012 | |
| JP | 2012-216447 A | 11/2012 | |
| JP | 2015-174173 A | 10/2015 | |
| KR | 20070097820 A | 10/2007 | |
| KR | 100987261 B1 | 10/2010 | |
| KR | 101430111 B1 | 8/2014 | |
| KR | 101442184 B1 | 9/2014 | |
| KR | 20150111551 A | 10/2015 | |
| KR | 20160084211 A | 7/2016 | |
| KR | 20170118447 A | 10/2017 | |
| KR | 20180103259 A | 9/2018 | |
| KR | 102120799 B1 | 6/2020 | |
| KR | 20210049471 A | 5/2021 | |
| KR | 102265233 B1 | 6/2021 | |

OTHER PUBLICATIONS

Extended European Search Report including Written Opinion for Application No. 23839933.1 dated Dec. 2, 2025, pp. 1-8.

* cited by examiner

[FIG. 1]
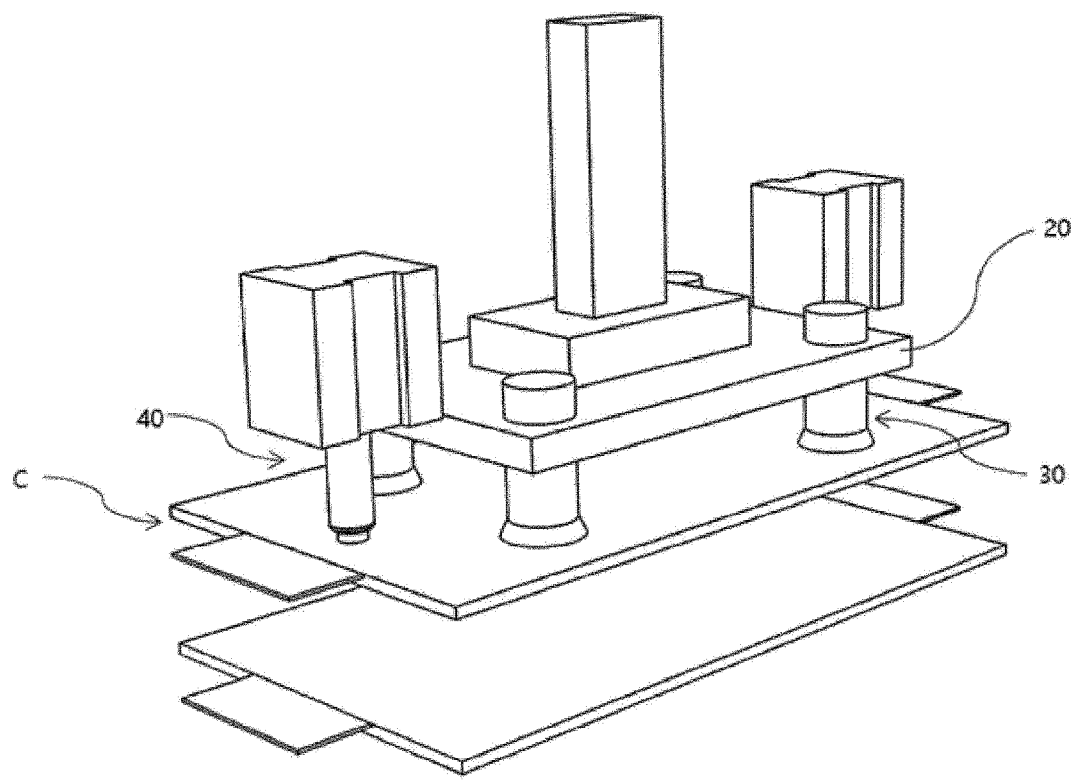

[FIG. 2]
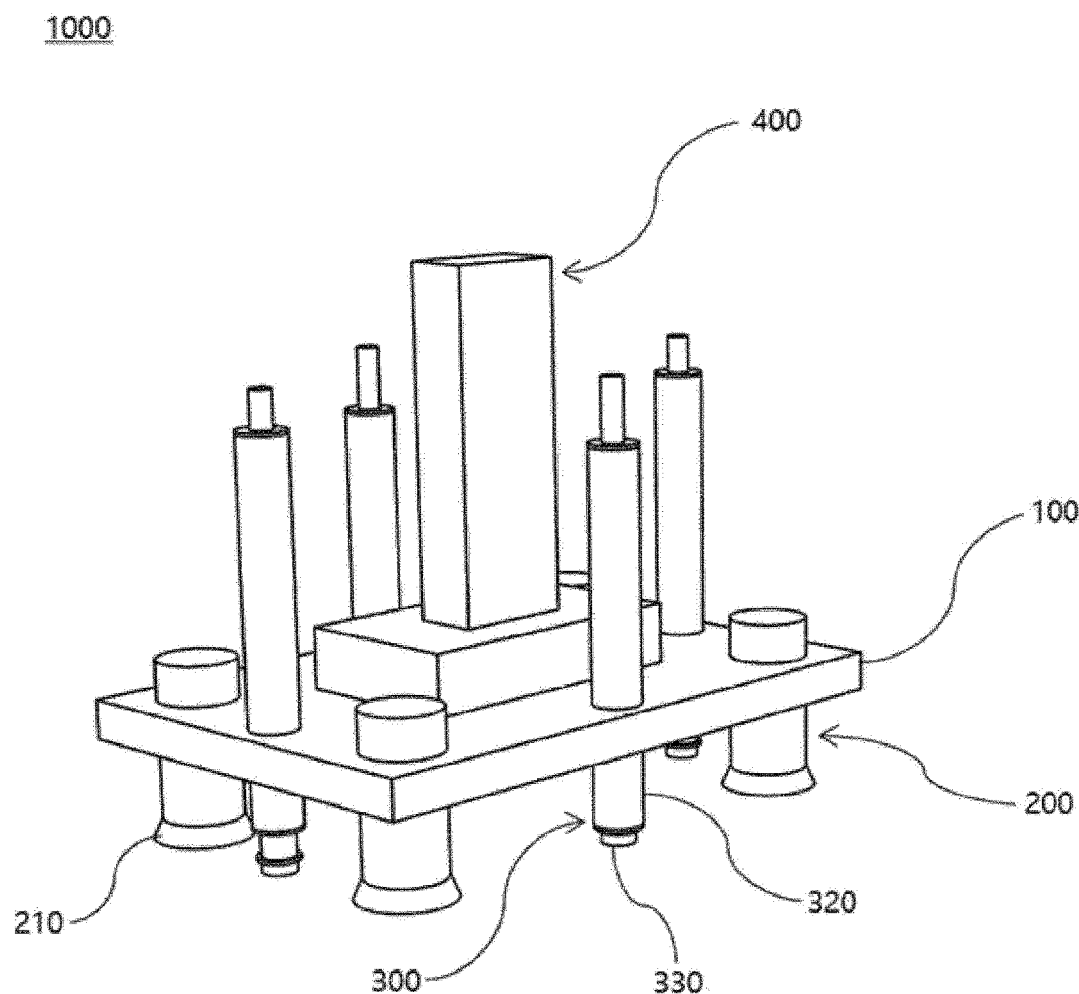

[FIG. 3]
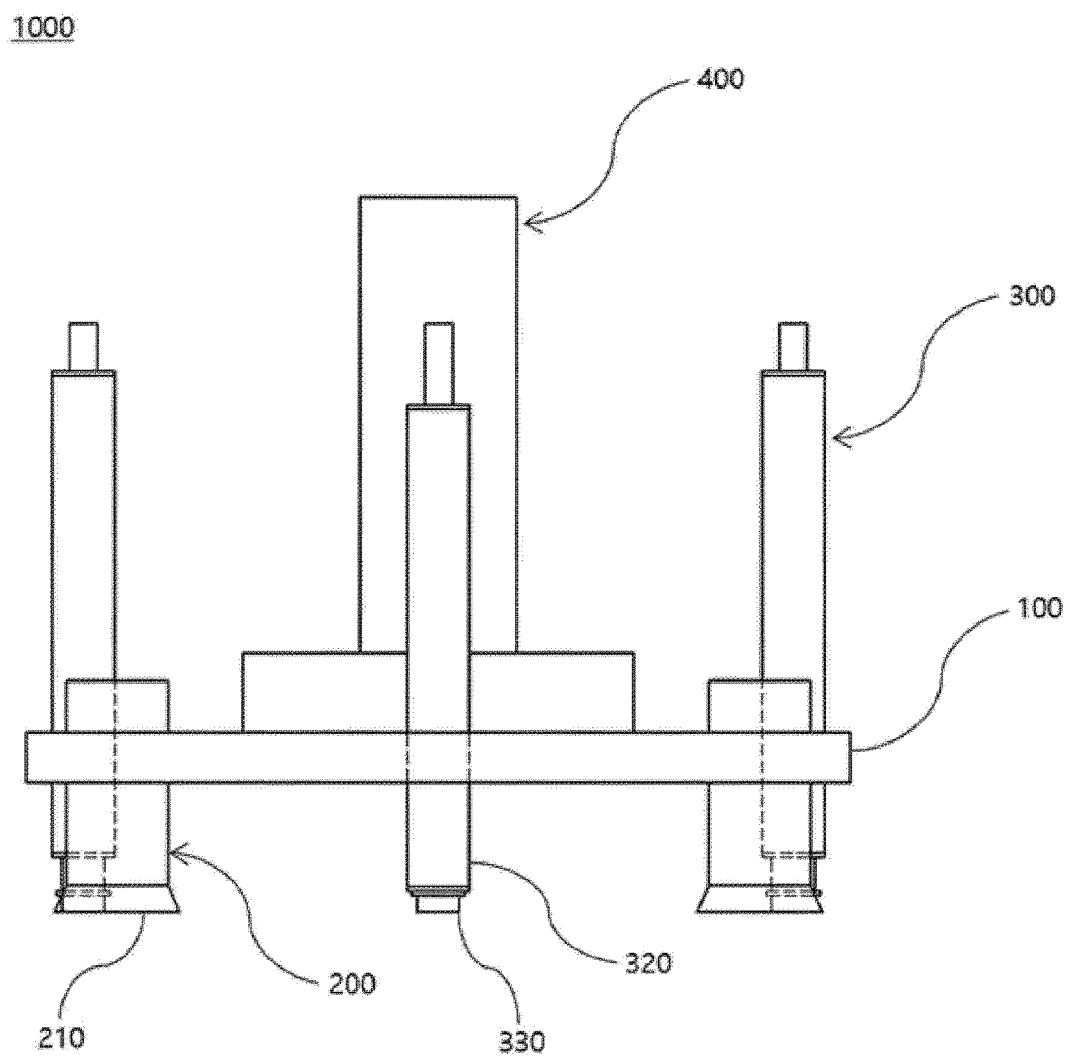

[FIG. 4]
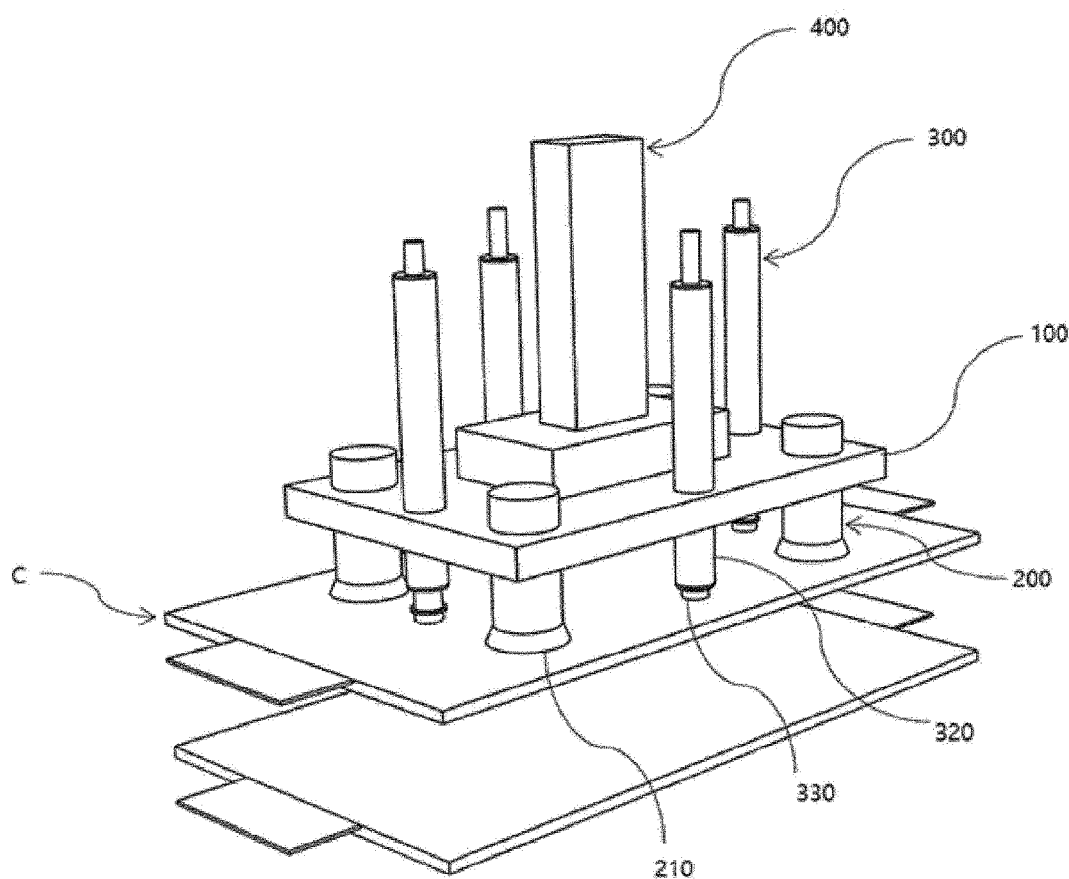

[FIG. 5]
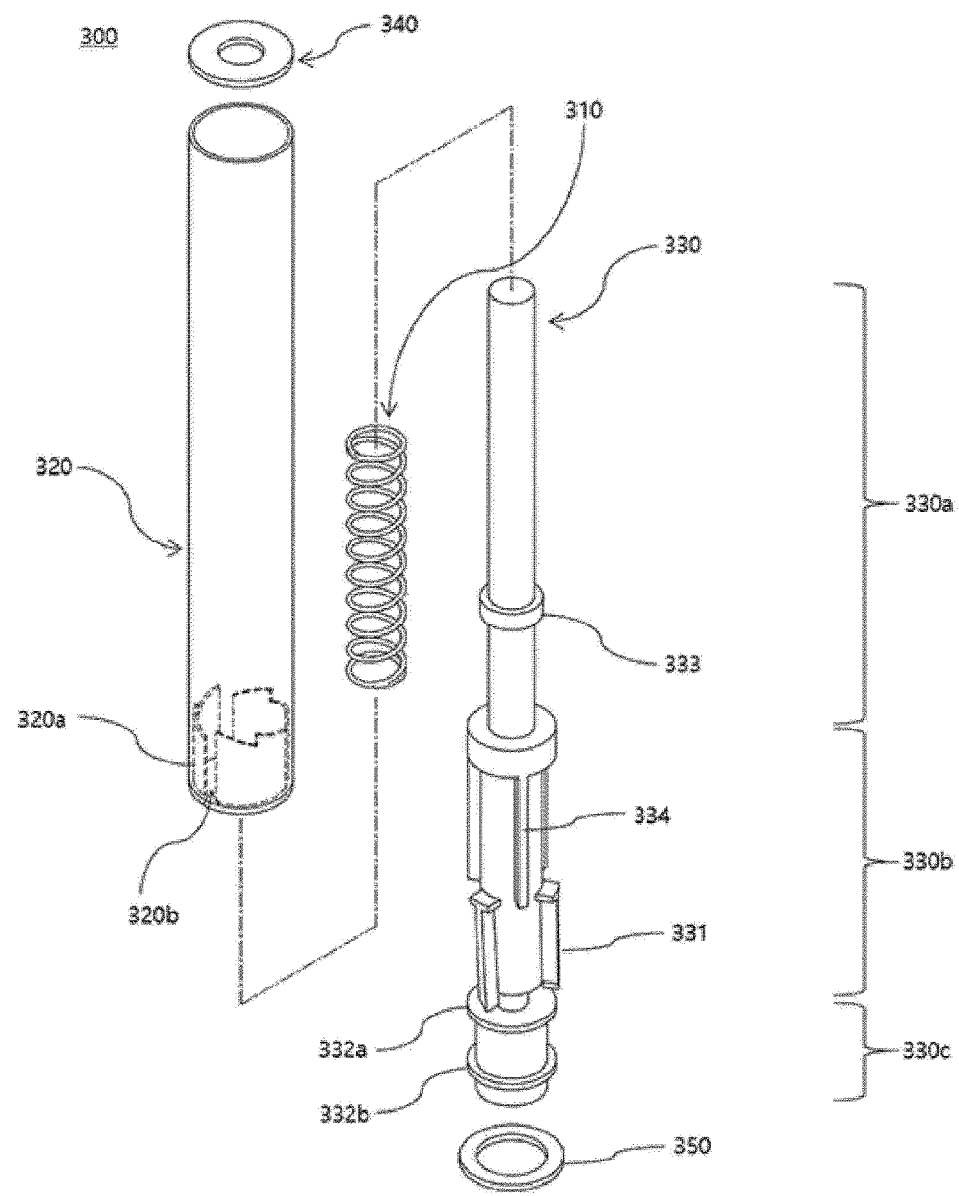

[FIG. 6A]
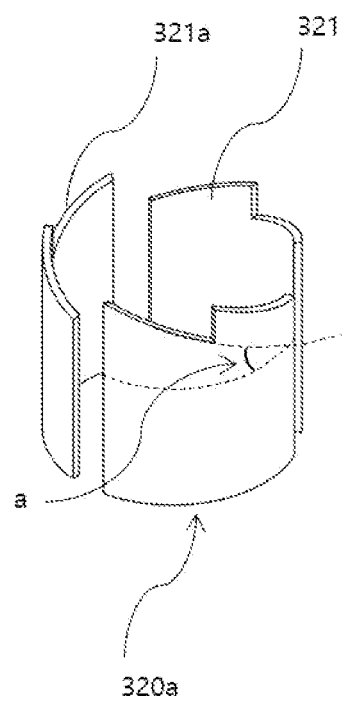

[FIG. 6B]
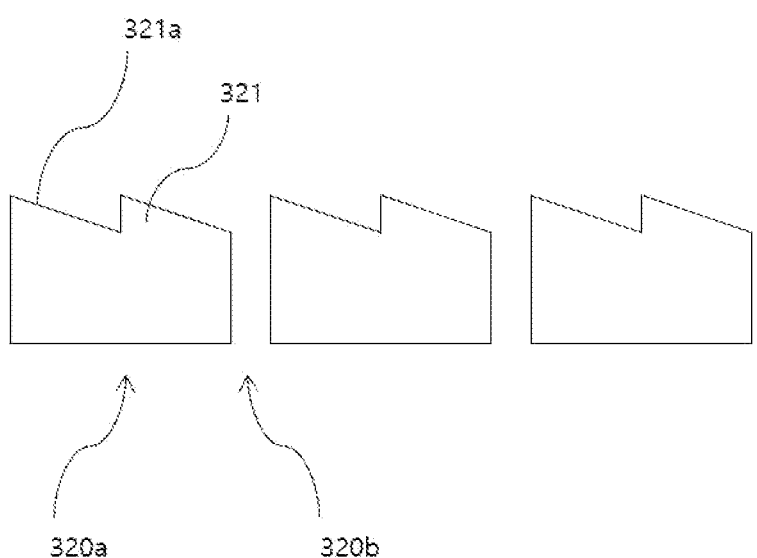

[FIG. 7A]
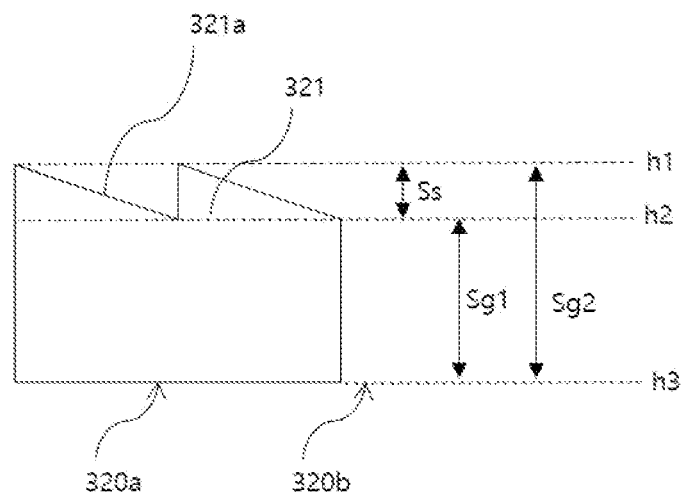

[FIG. 7B]
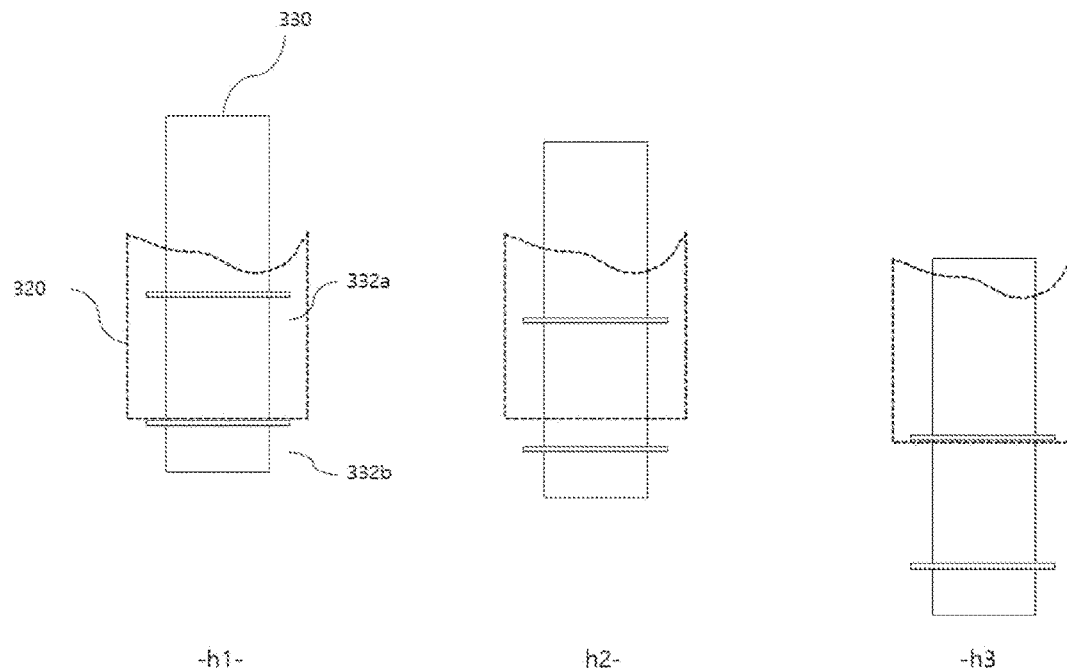

[FIG. 8]
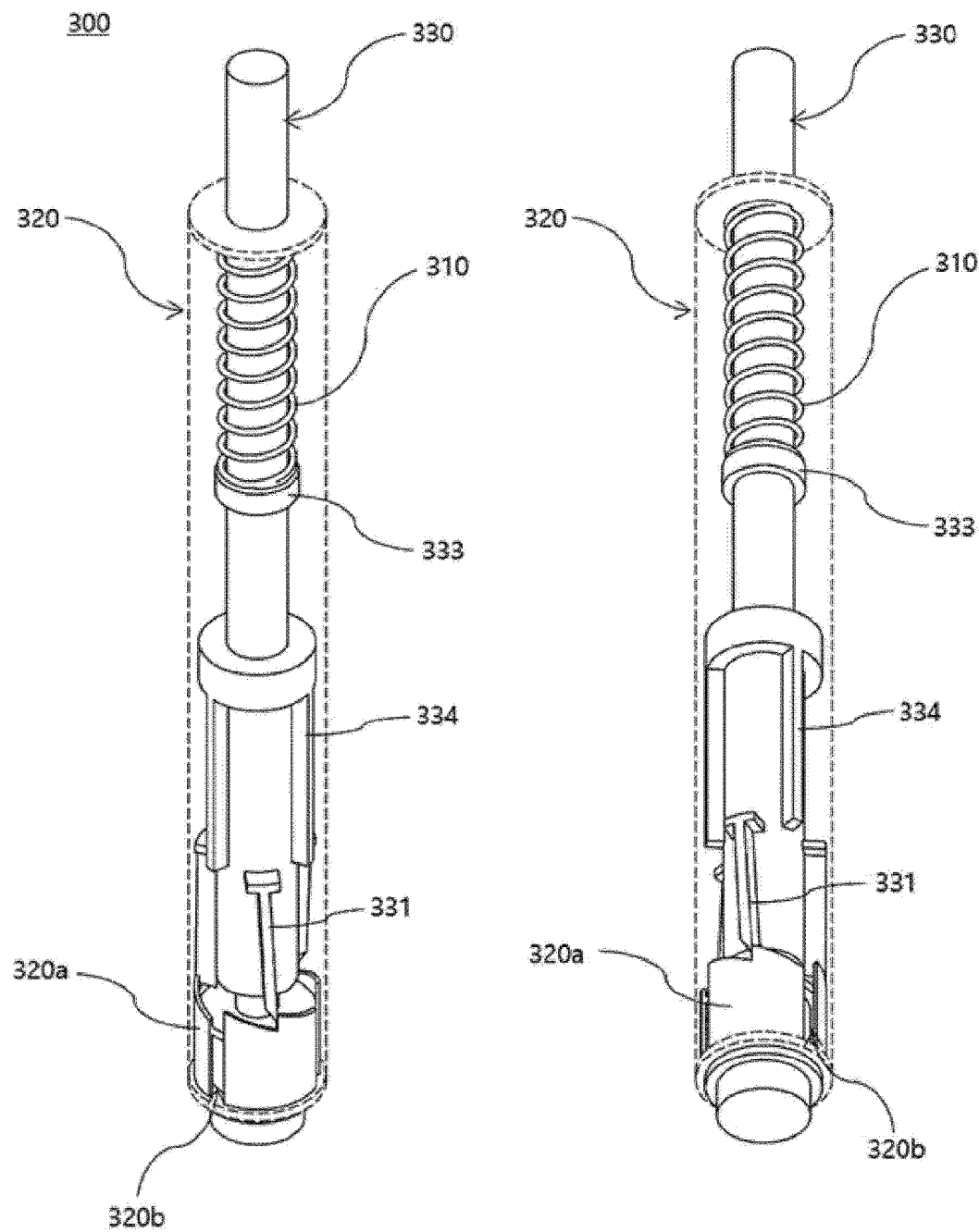

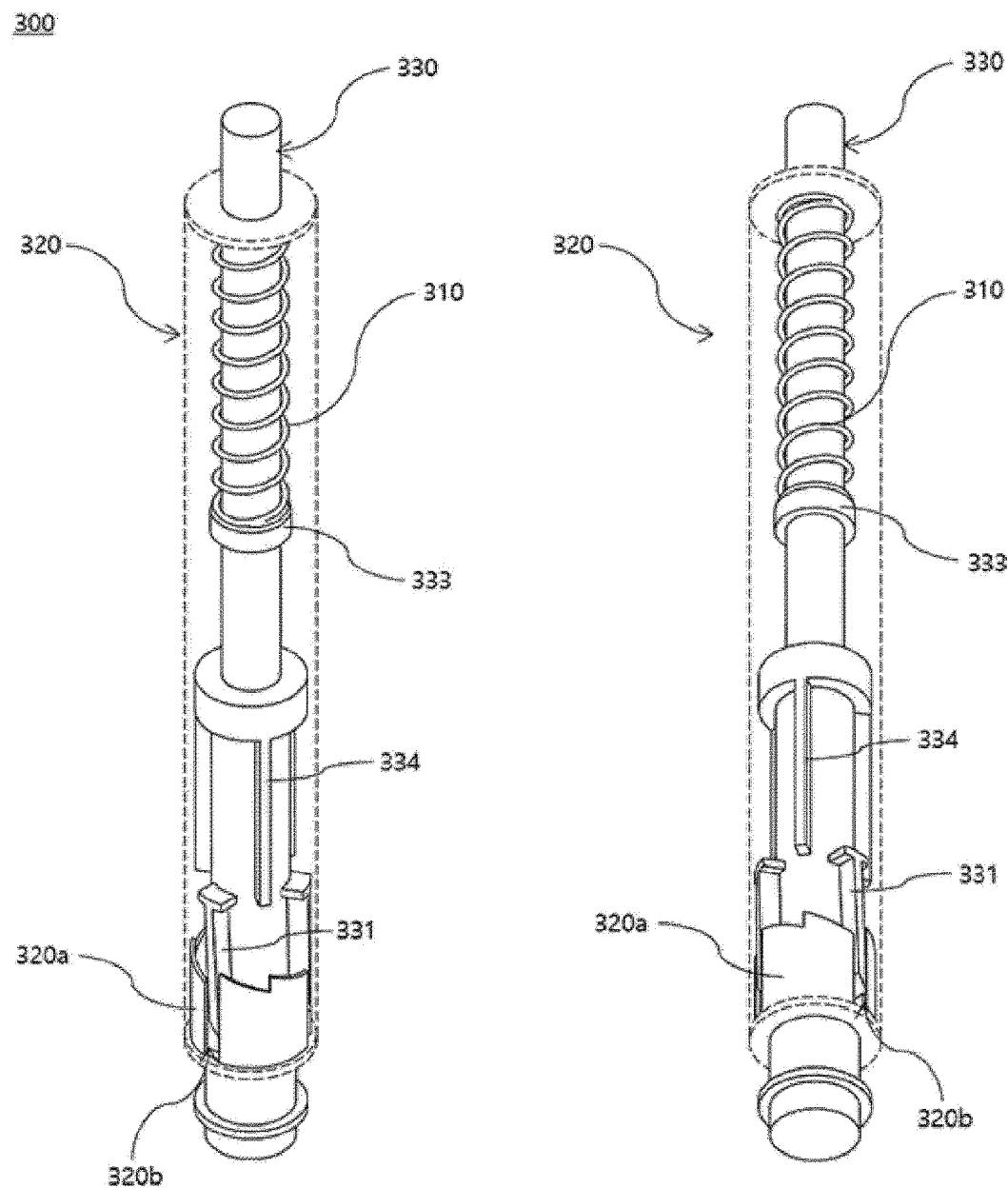
[FIG. 9]

[FIG. 10]
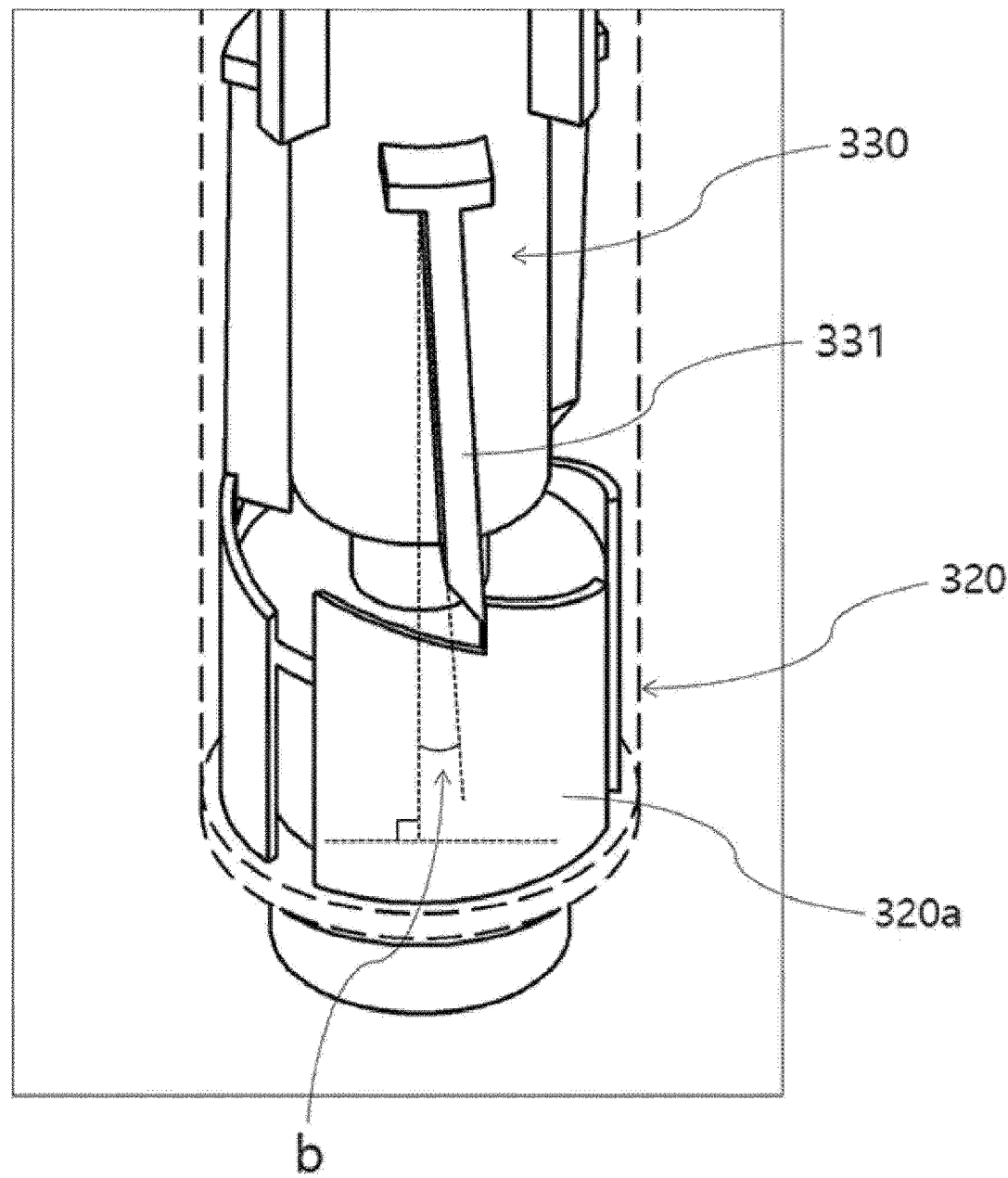

[FIG. 11]
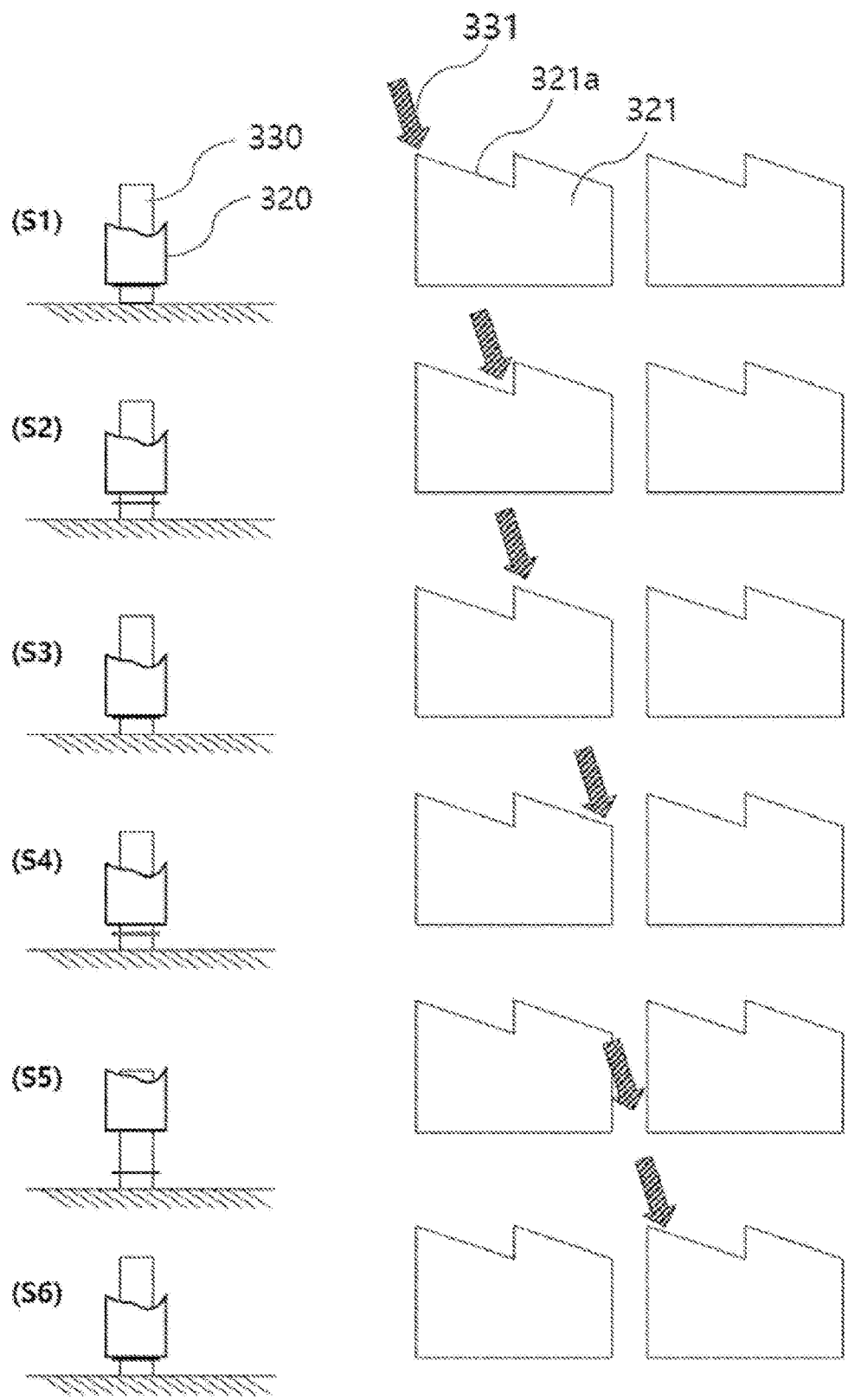

[FIG. 12]
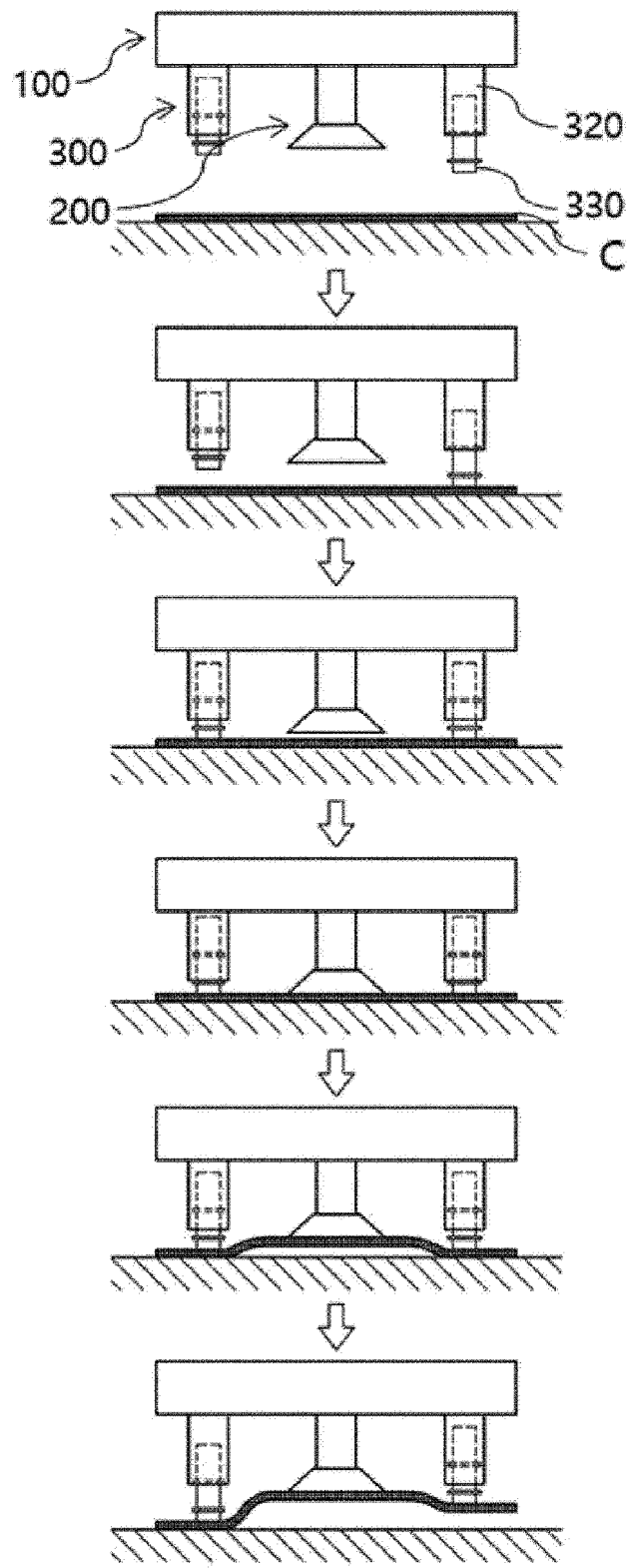

[FIG. 13]
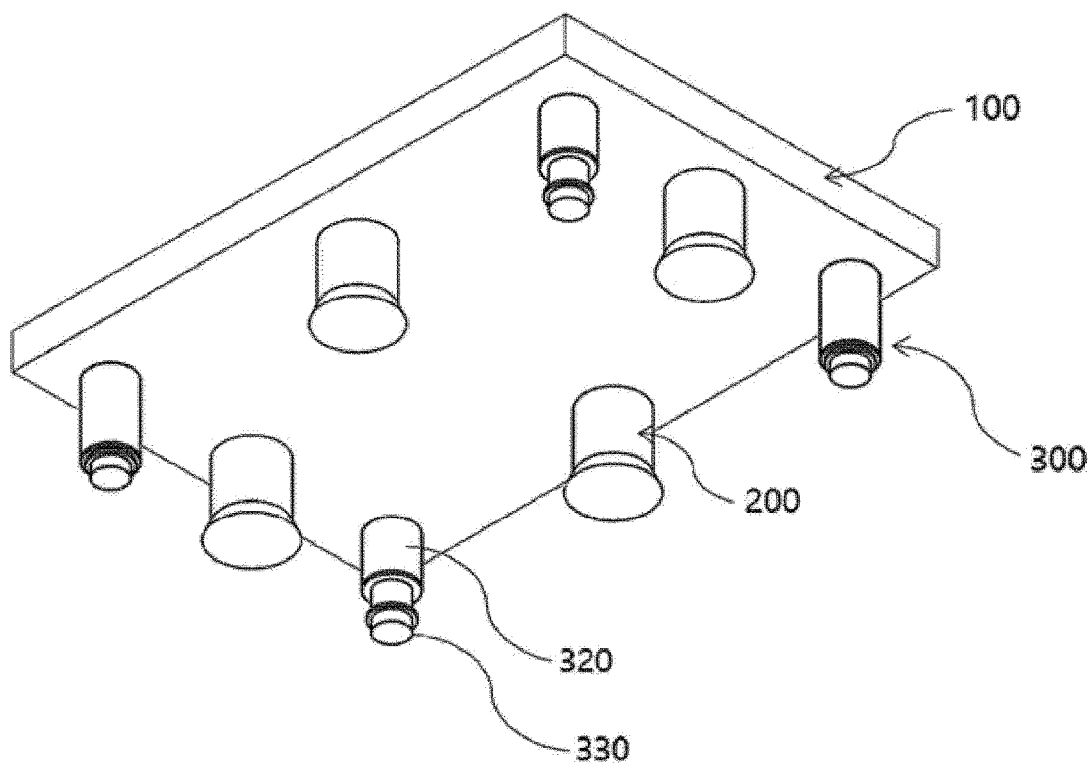

[FIG. 14]
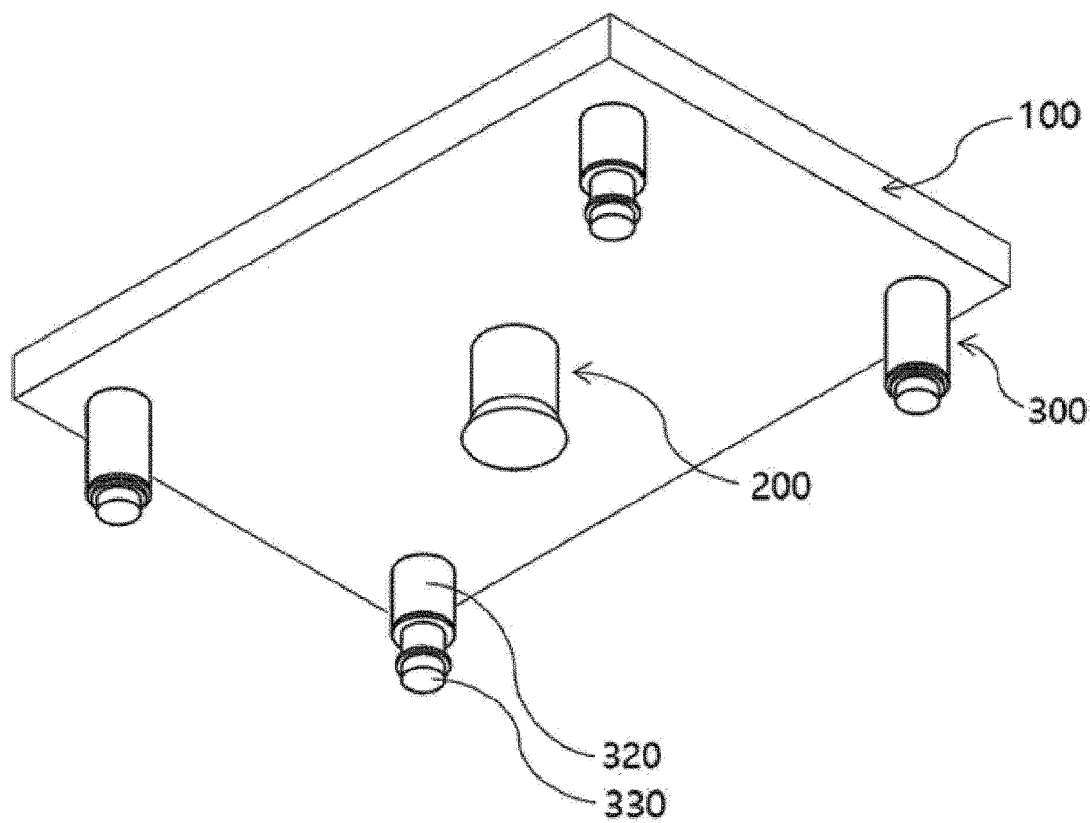

[FIG. 15]
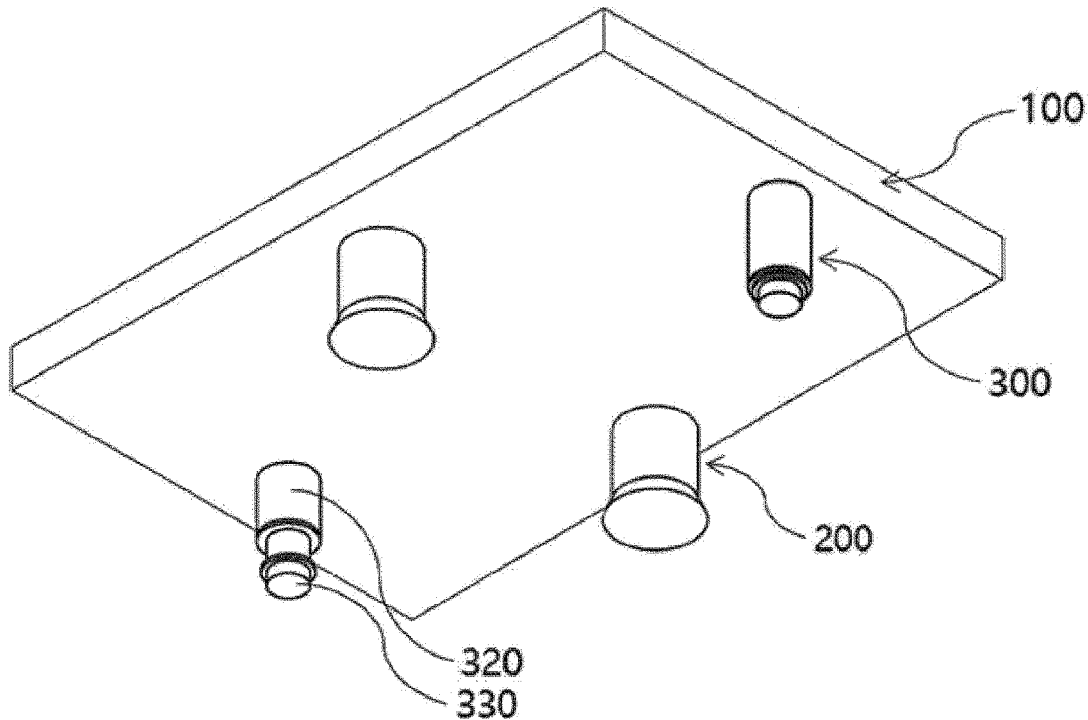
[FIG. 16]
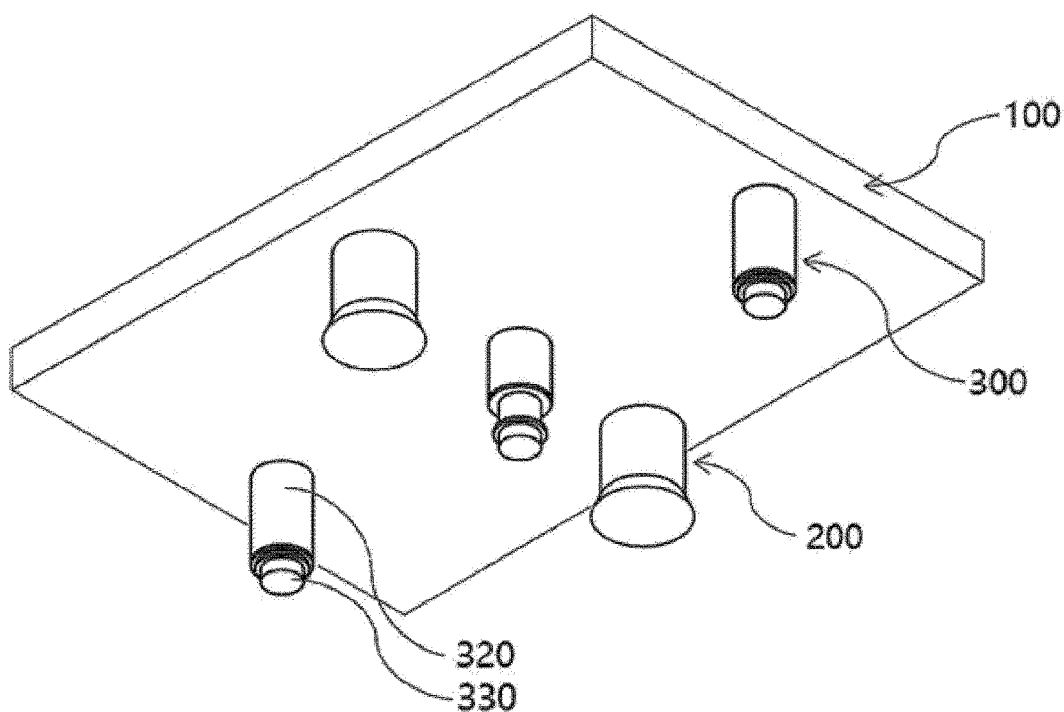

[FIG. 17]
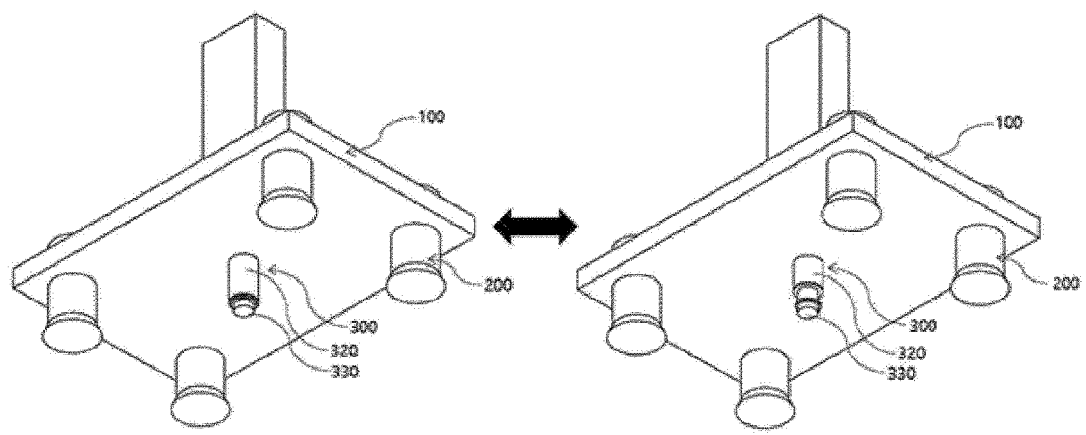

ADSORPTION APPARATUS

CROSS-REFERENCE TO RELATED APPLICATIONS

This application is a national phase entry under 35 U.S.C. § 371 of International Application No. PCT/KR2023/009865 filed on Jul. 11, 2023, which claims the benefit of priority based on Korean Patent Applications No. 10-2022-0086415, filed on Jul. 13, 2022, each of the disclosures of which is incorporated herein by reference in its entirety.

TECHNICAL FIELD

The present disclosure relates to an adsorption device, and more particularly to an adsorption device for adsorbing the top surface of a battery cell loaded in a loading bin, and for sequentially taking out and transporting the battery cell one by one.

BACKGROUND

In general, battery cells are classified into cylindrical battery cells and prismatic battery cells, in which an electrode assembly is embedded in a cylindrical or prismatic metal can, and pouch-type battery cells, in which the electrode assembly is embedded in a pouch-type case made of aluminum laminated sheet. In particular, there is a growing interest in and demand for pouch-type cells, which are easily deformable and have small weight.

When connecting cells in series/parallel to form a medium or large battery module, many pouch-type cells with high energy density and easy stacking are available, and they are stacked to form a battery cell stack. It is then common to package and protect the battery cell stack with a module frame, and add electrical components for electrical connection and voltage measurement of the cells to form a battery module.

Meanwhile, the manufactured battery cells are separated by type and loaded in loading bins, and the battery cells necessary in the process of manufacturing battery modules are individually taken out of the loading bins and are transported.

Due to the light weight of the pouch-type battery cells, they can be taken out or transported by adsorbing them to an adsorption device, but there is a problem that it is difficult to take out the battery cells in sheets due to the static electricity generated between the battery cells in the process of taking out the battery cells.

In addition, the pouch-type cells transported to the destination should be deintercalated to the adsorption device, but the residual pressure left in the suction unit prevents this deintercalation from occurring quickly, reducing the efficiency of the process.

Therefore, in order to solve the above problems, conventional methods have been used to remove the static electricity by emitting ionic wind toward the battery cell adsorbed by the adsorption device.

However, adsorption devices such as the ones described above require a delay between the release of the ionic wind and the effect of the ionic wind to be observed, so the extraction was not rapid. That is, there is a problem in that the process effectiveness is not high compared to the additional parts and costs for releasing the ionic wind.

In another example, a conventional method involved striking a battery cell adsorbed by an adsorption device to deintercalate residual battery cells that are electrostatically attached.

FIG. 1 is a perspective view of a conventional battery cell C adsorption device. A conventional battery cell C adsorption device adsorbs a battery cell C in contact with a suction unit 30 coupled to a base plate 20 as shown in FIG. 1, and strikes the battery cell C using a cylinder unit 40 including a rod that is hydraulically or electrically lifted up and down.

In the conventional adsorption device, it is possible to separate the battery cells C attached by static electricity in the process of suctioning the battery cells C through the cylinder unit 40 and the like, and to quickly separate the battery cells C attached by residual pressure in the process of deintercalating the battery cells C.

However, conventional adsorption devices require a separate component to provide hydraulic or electrical power to the cylinder unit, and the design becomes complex. They also consume additional energy, which reduces the efficiency of the process.

DETAILED DESCRIPTION

Technical Problem

Accordingly, the present disclosure was conceived to solve the above problems, and aims to provide an adsorption device capable of taking out battery cells loaded in a loading bin one by one without damage.

Other objects and advantages of the present disclosure will be understood from the following description, and will become apparent from the embodiments of the present disclosure. It will also be readily apparent that the objects and advantages of the present disclosure may be implemented by the other means and combinations thereof disclosed herein.

Technical Solution

According to the present disclosure, an adsorption device that adsorbs battery cells loaded in a loading bin and sequentially takes out and transports the battery cells, includes: a base plate capable of moving vertically and horizontally; a suction unit coupled to the base plate for adsorbing a battery cell located at a lower part of the base plate; and a push unit coupled to the base plate for striking the battery cell to produce a vibration in the battery cell adsorbed by the suction unit, wherein the push unit comprises a rod that is lifted up and down and strikes the top surface of the adsorbed battery cell to the lower end part, and the rod descends by the elastic force of a spring.

The push unit may include: a cylinder coupled to the base plate, and having an open bottom; a rod inserted into the cylinder and moving linearly reciprocating along the longitudinal direction of the cylinder; and a spring member, each end of which is coupled to the cylinder and the rod, respectively, and which pushes the rod downwardly.

The cylinder may include a ring-shaped lower cap that is coupled to the lower end part, and the rod may include an engaging part protruding along an outer circumferential surface to be engaged to the lower cap.

The rod may include a spring fixing part protruding along an outer circumferential surface in the upper part to support an end of the spring member.

The cylinder may include: a plurality of teeth parts, each comprising a protruding tooth blade to have a unidirectional slope along the perimeter of the inner side; and a groove part downwardly recessed between any one pair of teeth parts, and the rod may include: a moving blade protruding from one side of the outer circumferential surface to engage and disengage to the teeth part of the cylinder.

The teeth part may include a plurality of tooth blades formed by adhering to each other.

The rod may include: a support part that moves within the cylinder; a striking member extending from the support part and entering a lower part of the cylinder; and a teeth fixing part including the moving blade between the support part and the striking part.

The moving blades may be guided by an inclined plane of the tooth blade included in the teeth part of the cylinder.

The base plate may be coupled to a single push unit.

The push unit is formed at a location corresponding to the center of the adsorbed battery cell.

The base plate is coupled to a pair of push units, and the rods included in each of the push units may alternately ascend and descend.

The base plate is coupled to three push units, and the rods included in the pair of push units and the other remaining push unit may alternately ascend and descend.

*34The base plate is coupled to two pairs of push units, and the rods included in each pair of push units may alternately ascend and descend.

The push unit may be formed at a position corresponding to each end of the adsorbed battery cell.

The push unit may be formed at a position corresponding to respective corner part of the adsorbed battery cell.

Advantageous Effects

According to the present disclosure, in the process of taking out the battery cells loaded in the loading bin, it is possible to easily deintercalate the residual battery cells attached by static electricity by causing the battery cells to vibrate and twist without any electricity supply, thereby improving the efficiency of the process.

In addition, according to the present disclosure, it is possible to shorten the process of taking out the battery cells and deintercalating them to a targeted area.

BRIEF DESCRIPTION OF THE DRAWINGS

FIG. 1 is a perspective view of a conventional adsorption device.

FIG. 2 is a perspective view of an adsorption device according to a first embodiment of the present disclosure.

FIG. 3 is a side view of the adsorption device of FIG. 2.

FIG. 4 illustrates the adsorption device of FIG. 2 with a battery cell adsorbed.

FIG. 5 is an exploded perspective view of a push unit of the present disclosure.

FIG. 6 illustrates a teeth and groove part included in a cylinder.

FIG. 7 illustrates a change in position of a rod being lifted by any one teeth part of FIG. 6 and a moving blade moving along a teeth blade.

FIG. 8 illustrates an internal structure of a push unit when a moving blade is positioned on a teeth part.

FIG. 9 illustrates an internal structure of a push unit when a moving blade is positioned on a groove part.

FIG. 10 is an enlarged view of a teeth part and a moving blade positioned on the teeth part.

FIG. 11 shows a step-by-step illustration of a lateral movement of a moving blade according to the up and down movement of a rod.

FIG. 12 illustrates rods that alternately ascend and descend as the adsorption device moves up and down toward the bottom on which the battery cell is settled, and the process by which the battery cell is deformed by the rods.

FIG. 13 is a bottom perspective view of an adsorption device according to a second embodiment of the present disclosure.

FIG. 14 is a bottom perspective view of an adsorption device according to a third embodiment of the present disclosure.

FIG. 15 is a bottom perspective view of an adsorption device according to a fourth embodiment of the present disclosure.

FIG. 16 is a bottom perspective view of an adsorption device according to a fifth embodiment of the present disclosure.

FIG. 17 is a bottom perspective view of an adsorption device according to a sixth embodiment of the present disclosure.

BEST MODE FOR CARRYING OUT THE DISCLOSURE

Hereinafter, preferred embodiments of the present disclosure will be described in detail with reference to the accompanying drawings. Before doing so, it should be noted that the terms and words used in this specification and claims are not to be construed in their ordinary or dictionary sense, but rather in a sense and concept consistent with the technical idea of the disclosure, based on the principle that the inventor may properly define the concept of a term to best describe his disclosure.

Accordingly, it is to be understood that the embodiments described herein and the configurations illustrated in the drawings are only the most preferred embodiments of the present disclosure and do not represent all of the technical ideas of the disclosure, and that there may be various equivalents and variations that may be substituted for them at the time of filing the present application.

In addition, in describing the present disclosure, detailed descriptions of related known configurations or functions are omitted when it is determined that such detailed descriptions would obscure the essence of the disclosure. Since the embodiments of the present disclosure are provided to more fully illustrate the disclosure to those of ordinary skill in the art, the shapes and sizes of the components in the drawings may be exaggerated, omitted, or shown schematically for clarity. Accordingly, the size or proportions of each component are not necessarily indicative of its actual size or proportions.

The present disclosure relates to an adsorption device that adsorbs the top surface of a battery cell loaded in a loading bin, and sequentially removes and transports the battery cell one by one.

FIGS. 2 through 12 illustrate an adsorption device according to a first embodiment of the disclosure, FIG. 13 illustrates an adsorption device according to a second embodiment of the disclosure, FIG. 14 illustrates an adsorption device FIG. to a third embodiment of the disclosure, FIG. 15 illustrates an adsorption device according to a fourth embodiment of the disclosure, FIG. 16 illustrates an adsorption device according to a fifth embodiment of the disclosure, and FIG. 17 illustrates an adsorption device according to a sixth embodiment of the disclosure.

Hereinafter, the adsorption device of the present disclosure will be described with reference to the accompanying drawings.

First Embodiment

FIG. 2 is a perspective view of an adsorption device 1000 according to a first embodiment of the present disclosure, FIG. 3 is a side view of the adsorption device 1000 of FIG. 2, and FIG. 4 shows the adsorption device 1000 of FIG. 2 with a battery cell C adsorbed.

The adsorption device 1000 of the present disclosure includes a base plate 100, a suction unit 200, and a push unit 300, as shown in FIGS. 2 and 3.

The adsorption device 1000 of the present disclosure can be positioned by a moving bar 400, which is moved in vertical and horizontal directions by a driving member.

The base plate 100 is coupled with the moving bar 400, and is moved vertically and horizontally by the moving bar 400.

The base plate 100 of the present disclosure need not be limited in structure by the illustrated drawings, and it is sufficient if it has a structure that allows the suction unit 200 and push unit 300 to be coupled to the base plate 100 to perform their functions.

The suction unit 200 serves to directly adsorb the battery cell C.

The suction unit 200 is coupled with the base plate 100 to adsorb the battery cells C located at the lower part of the base plate 100.

The suction unit 200 includes a nozzle 210 coupled to its lower part, and a suction pipe (not shown) internally connecting the nozzle 210 with a separate suction pump or the like providing suction power.

The suction unit 200 adsorbs the battery cell C through the nozzle 210 by the operation of the suction pump.

The nozzle 210 is the part that directly contacts the surface of the battery cell C, and can be of any shape that does not damage the surface of the battery cell C.

As shown in FIG. 4, the adsorption device 1000 according to the first embodiment includes four suction units 200 corresponding to each corner part position of the battery cell C for stable adsorption of the battery cell C.

The push unit 300 generates a vibration on the battery cell C adsorbed by the suction unit 200 in order to detach the battery cell C directly adsorbed by the suction unit 200 and the residual battery cell C attached by static electricity.

The push unit 300 is coupled to the base plate 100 such that it is capable of striking the upper surface of the battery cell C adsorbed by the suction unit 200 at the lower surface of the base plate 100.

The push unit 300 includes a cylinder 320 directly coupled to the base plate 100, and a rod 330 inserted inside the cylinder 320 to move up and down.

The rod 330 descends by an elastic force of a spring and strikes the adsorbed battery cell C to induce a vibration in the battery cell C.

FIG. 5 is an exploded perspective view of the push unit 300 of the present disclosure.

As shown in FIG. 5, the push unit 300 includes a cylindrical cylinder 320, hollow and open at the bottom, a rod 330 configured to be inserted inside the cylinder 320, and a spring member 310 coupled at both ends to the cylinder 320 and rod 330, respectively, and configured to push the rod 330 downwardly via an elastic force.

The cylinder 320 includes a plurality of tooth blades 321 protruding along its inner surface perimeter and a groove part 320b downwardly recessed between any one of the tooth blades 321.

More specifically, the cylinder 320 includes a plurality of teeth parts 320a including tooth blades 321 protruded to be inclined unidirectionally, and a groove part 320b downwardly recessed between any pair of the teeth parts 320a.

FIG. 6(a) is an isolated view of only the teeth part 320a and groove part 320b of the cylinder 320 of FIG. 5, and FIG. 6(b) is a plan view of the teeth part 320a and groove part 320b that are shown as curved surfaces in FIG. 6(a).

Referring to FIG. 6, teeth part 320a including the two tooth blades 321 are formed at predetermined spacings, and groove parts 320b are formed at the gaps between the teeth parts 320a.

The tooth blades 321 included in the teeth part 320a are attached to each other, and each of the tooth blades 321 includes an inclined surface 321a inclined in one direction. At this time, each tooth blade 321 is formed at the same height, and has the inclined surface 321a formed at same angle (a) with each other.

In addition, it is preferred that the lowest position of the tooth blade 321 inclined surface 321a is formed at a position higher than the bottom of the groove part 320b.

Preferably, at least one teeth part 320a is formed by at least two tooth blades 321 being attached, and preferably, at least one teeth part 320a and a groove part 320b are each formed on the cylinder 320 included in the adsorption device 1000 of the present disclosure.

The angle of the inclined surface 321a of the tooth blade 321 and the depth of the groove part 320b are not particularly limited in the present disclosure.

The cylinder 320 further includes an upper cap 340 having a hole formed in its center for a rod 330 to protrude therefrom, and the spring member 310 may be supported by the upper cap 340.

The upper cap 340 may be detachably disposed with respect to the cylinder 320, or may be integrally manufactured with the cylinder 320.

Additionally, the spring member 310 may be supported by the upper cap 340, but is not limited thereto, and any form of member may be utilized to support the upper end part of the spring member 310 such that the spring member 310 transmits elastic force only downwardly.

The cylinder 320 further includes a lower cap 350 having a hole formed therein to allow the rod 330 to enter into an open lower part so as to prevent the rod 330 from being completely disengaged from the cylinder 320.

The lower cap 350 may be detachably disposed with respect to the cylinder 320, or may be integrally manufactured with the cylinder 320.

The rod 330 is inserted into the cylinder 320 and moves in a straight reciprocating motion along the longitudinal direction of the cylinder 320.

The rod 330 includes a moving blade 331 protruding from one side of its outer circumferential surface to engage and disengage the teeth part 320a of the cylinder 320, as shown in FIG. 5. In other words, the rod 330 can be rotated in the direction of the inclined surface 321a of the tooth blade 321 and lifted up and down with respect to the cylinder 320 by the moving blade 331, which is guided by the teeth part 320a and the groove part 320b of the cylinder 320.

Specifically, the rod 330 may be divided into a support part 330a, a striking part 330c, and a teeth fixing part 330b.

The support part 330a is a movable portion within the cylinder 320, and includes a spring fixing part 333 that supports the spring member 310.

The spring fixing part 333 is formed to protrude along the outer peripheral surface of the rod 330 to support the lower end of the spring member 310 at the upper part of the rod 330.

The rod 330 descends under downward pressure by the elastic force of the spring member 310 transmitted through the spring fixing part 333.

The striking part 330c is a portion extending from the support part 330a and entering the lower part of the cylinder 320, and includes a engaging part 332 protruding along an outer circumferential surface to be engaged to a lower cap 350 of the cylinder 320.

The engaging part 332 includes a first engaging part 332a formed on the upper part of the lower cap 350 to prevent the rod 330 from being completely disengaged from the cylinder 320, and a second engaging part 332b formed on the lower part of the lower cap 350 to prevent the rod 330 from being completely inserted into the cylinder 320.

Since the first engaging part 332a located at the upper part of the lower cap 350 moves up and down with the rod 330 at certain spacings within the cylinder 320, the teeth part 320a within the cylinder 320 is preferably protruding enough to not interfere with the movement of the first engaging part 332a. Alternatively, the first engaging part 332a is preferably formed to protrude from the rod 330 such that it does not engage to the teeth part 320a.

The rod 330 may strike the battery cell C adsorbed in the suction unit 200 via the end of the striking part 330c.

The teeth fixing part 330b is located between the support part 330a and the striking part 330c, and includes a moving blade 331 that is engaged to the teeth part 320a and the groove part 320b of the cylinder 320.

The rod 330 may include at least one moving blade 331.

*119Since the rod 330 receives a certain elastic force from the spring member 310, it is continuously subjected to a downward pressure. At this time, the rod 330 does not deviate from the cylinder 320 beyond a certain distance because the moving blade 331 protruding from the rod 330 is regulated in its downward movement by the tooth blade 321 of the teeth part 320a, or the engaging part 332 is regulated in its downward movement by the lower cap 350 of the cylinder 320.

The moving blade 331 remains in a state in which the rod 330 transmits an elastic force on the teeth part 320a to the tooth blade 321 unless there is an external force transmitted upwardly. The rod 330 is lifted up and down as the moving blade 331 rotates along the inner circumferential surface of the cylinder 320.

FIG. 7 illustrates a change in position of the rod 330 being lifted by a moving blade 331 moving along the teeth part 320a and any one tooth blade 321 of FIG. 6, FIG. 8 illustrates the internal structure of the push unit 300 when the moving blade 331 is positioned on the teeth part 320a, and FIG. 9 illustrates the internal structure of the push unit 300 when the moving blade 331 is positioned on the groove part 320b.

Referring to FIG. 7(a), three displacement sections are formed relative to the longitudinal direction of the cylinder 320 by one teeth part 320a including two tooth blades 321 and a groove part 320b formed adjacent to the teeth part 320a. Specifically, the displacement sections may be divided into a teeth section Ss between the highest position h1 of the tooth blade 321 inclined surface 321a and the lowest position h2 of the tooth blade 321 inclined surface 321a, a first groove section Sg1 between the lowest position h2 of the tooth blade 321 inclined surface 321a and the lowest position h3 the groove part 320b, and a second groove section Sg2 between the highest position h1 of the tooth blade 321 inclined surface 321a and the lowest position h3 of the groove part 320b.

FIG. 7(B) illustrates the position of the rod 330 when the moving blade 331 end is in positions h1, h2, and h3, wherein the rod 330 is most deeply inserted into the cylinder 320 when the moving blade 331 end is in position h1, and most protrudes from the cylinder 320 when the moving blade 331 end is in position h3. Furthermore, the rod 330 remains protruding from the cylinder 320 by the height of the inclined surface 321a of the tooth blade 321 when the end of the moving blade 331 hangs over the boundary of the two tooth blades 321.

FIG. 8 illustrates the structure of the push unit 300 when the moving blade 331 is on the teeth part 320a, and FIG. 9 illustrates the structure of the push unit 300 when the moving blade 331 is on the groove part 320b.

According to FIGS. 8 and 9, the striking part 330c of the rod 330 is deeply inserted into the cylinder 320 when the moving blade 331 is on the tooth blade 321, and when the moving blade 331 is inserted into the groove part 320b formed between the teeth parts 320a, the striking part 330c of the rod 330 protrudes from the cylinder 320 by the distance traveled by the moving blade 331.

The teeth fixing part 330b may further include a safety bar 334 protruding from an upper part of the moving blade 331 at a location intersecting the moving blade 331.

The safety bar 334 may be used to assist in the role of the engaging part 332, or for the purpose of regulating the degree of descent of the moving blade 331. For example, the safety bar 334 may be used to regulate the further descent of the moving blade 331 into the groove part 320b of the cylinder 320 by being caught between the tooth blades 321 on the teeth part 320a.

The safety bar 334 may be protruding to extend downwardly as shown in FIG. 5, or may be formed in a plurality to more reliably regulate the movement of the moving blades 331. In this case, the plurality of safety bars 334 are formed to intersect with each of the moving blades 331.

The rod 330 included in the push unit 300 of the present disclosure is subjected to downward pressure by the elastic force of the spring member 310 and, conversely, upward pressure by the driving force of the adsorption device 1000 descending to the bottom. Preferably, the driving force is greater than the elastic force of the spring member 310.

Specifically, as the adsorption device 1000 descends to the bottom on which the battery cell C rests, the end of the rod 330 will be pressed against the bottom and causes the rod 330 to rise upward because the pressing force, i.e., the driving force, is greater than the elastic force of the spring member 310.

Furthermore, as the adsorption device 1000 rises upward, the driving force exerted on the rod 330 becomes weaker, and as the driving force becomes weaker, the elastic force becomes stronger, causing the rod 330 to fall back downward.

Substantially, the movement of the moving blade 331 and the rotation of the rod 330 in the push unit 300 of the present disclosure is made possible by the elastic force of the spring member 310 applied to the rod 330 and the driving force transmitted to the base plate 100.

The unidirectional rotation of the rod 330 by the upward and downward forces applied to the rod 330 as described above is made possible by the moving blade 331 being inclined at an angle in the direction of rotation.

FIG. 10 is an enlarged view of the teeth part 320a and the moving blade 331 located on said teeth part 320a, wherein the moving blade 331, which is formed as an extension along the longitudinal direction of the rod 330, is inclined by a certain angle (b) with respect to the vertical direction. Thus, when the rod 330 is moved up and down, the rod 330 is engaged to the highest positioned step on each tooth blade 321 with its inclined end and, simultaneously with the engagement, is naturally moved in an inclined direction along the inclined surface 321a of the tooth blade 321.

In the same manner as described above, the moving blade 331 alternately moves through the teeth part 320a and the groove part 320b.

FIG. 11 is a step-by-step illustration of the lateral movement of the moving blade 331 in response to the up and down movement of the rod 330.

Step S1 illustrates the adsorption device 1000 descending to the bottom so that the rod 330 is maximally pressed to the bottom, wherein the moving blade 331 engages to a step at the highest position of the first tooth blade 321. Step S2 is shown in which the adsorption device 1000 ascends so that the rod 330 is released from its pressed state from the bottom, and as the adsorption device 1000 ascends, the elastic force of the spring member 310 acts more strongly so that the moving blade 331 is subjected to a predominantly downward pressure.

Therefore, the moving blade 331 moves in a rightward direction along the inclined surface 321a of the first tooth blade 321 and the rod 330 rotates. The moving blade 331 travels until its movement is impeded by the second tooth blade 321, and then spans between the two tooth blades 321. When the moving blade 331 is in this position, the rod 330 remains not fully protruding from the cylinder 320 because the downward movement of the moving blade 331 is regulated by the teeth part 320a, even if the rod 330 is completely off the ground.

Step S3 illustrates the adsorption device 1000 being descended back towards the bottom after step S2, such that the rod 330 is maximally depressed, wherein the moving blade 331 is engaged to the highest positioned step of the second tooth blade 321. Step S4 illustrates the adsorption device 1000 ascending so that the rod 330 is again released from being pressed from the bottom, and as the adsorption device 1000 ascends, the elastic force of the spring member 310 acts more strongly so that the moving blade 331 is subjected to predominantly downward pressure. Thus, the moving blade 331 moves in a rightward direction along the inclined surface 321a of the second tooth blade 321 and the rod 330 rotates. The moving blade 331 falls past the inclined surface 321a of the second tooth blade 321 and into the adjacent groove part 320b. Step S5 illustrates a state in which the adsorption device 1000 is further ascended so that the rod 330 is subjected to solely elastic forces, and the moving blade 331 is fully inserted into the groove part 320b. Furthermore, the rod 330 is maximally protruded from the cylinder 320 by the movement of the moving blade 331. Step S6 illustrates a state in which the adsorption device 1000 has been moved completely toward the bottom as in steps S1 and S3, wherein the rod 330 is maximally pressed against the bottom, and the moving blade 331 is engaged to a step at the highest position of the first tooth blade 321 of the second teeth part 320a.

Therefore, as the adsorption device 1000 of the present disclosure repeats the motion of descending and ascending toward the bottom, the rod 330 and the moving blade 331 of the push unit 300 repeat the movement as in steps S1 to S5, and the battery cell C adsorbed by the suction unit 200 is struck and vibrated by the rod 330 emerging from the cylinder 320.

The adsorption device 1000 according to the first embodiment of the disclosure includes two pairs of suction units 200 coupled to a base plate 100, and rods 330 included in each pair of push units 300 alternately ascends and descends.

FIG. 12 is a simplified illustration of the deformation of the battery cell C by the adsorption device 1000 and the rods 330 that alternately ascend and descend as the battery cell C moves up and down toward the bottom on which the battery cell C is settled.

That is, in the pair of push units 300 by which the rod 330 is alternately ascended and descended in the adsorption device 1000 of the present disclosure, the moving blades 331 of the rod 330 are located at different parts among the teeth part 320a and the groove part 320b of the cylinder 320, respectively, and thereby causes a difference in the degree of lifting of the rod 330. That is, if the moving blade 331 included in one of the pairs of push units 300 is located in the teeth part 320a, the moving blade 331 included in the other may be located in the groove part 320b.

As shown in FIG. 12, while the battery cell C is adsorbed by the suction unit 200, the rods 330 included in each of the push units 300 alternately strike the battery cell C, thereby causing a vibration to be generated in the battery cell.

Second Embodiment

The adsorption device 1000 according to a second embodiment of the disclosure includes two pairs of push units 300 coupled to the base plate 100, and a rod 330 included in each pair of push units 300 is alternately ascended and descended.

FIG. 13 is a bottom perspective view of an adsorption device 1000 according to a second embodiment of the present disclosure.

The push units 300 included in the adsorption device 1000 are formed at positions corresponding to each corner part of the adsorbed battery cell C. At this time, the rods 330 included in each of the pair of push units 300 located in a direction diagonal to each other relative to the base plate 100 ascend and descend to the same extent in the same direction, and the rods 330 included in each of the pair of push units 300 formed at both corner parts on one side of the base plate 100 ascend and descend alternately.

Third Embodiment

The adsorption device 1000 according to the third embodiment of the disclosure includes a single suction unit 200 coupled to the center of a base plate 100, two pairs of push units 300 coupled to the base plate 100 as in the second embodiment, and rods 330 included in each pair of push units 300 that alternately ascend and descend.

FIG. 14 is a bottom perspective view of an adsorption device 1000 according to a third embodiment of the present disclosure.

The push units 300 included in the adsorption device 1000 are formed at positions corresponding to each corner part of the adsorbed battery cell C. At this time, the rods 330 included in each of the pair of push units 300 located in a direction diagonal to each other relative to the base plate 100 ascend and descend to the same extent in the same direction, and the rods 330 included in each of the pair of push units 300 formed at both corner parts on one side of the base plate 100 ascend and descend alternately.

Fourth Embodiment

The adsorption device 1000 according to a fourth embodiment of the disclosure includes a pair of push units 300 coupled to the base plate 100, wherein a rod 330 included in each push unit 300 is alternately ascended and descended.

FIG. 15 is a bottom perspective view of an adsorption device 1000 according to a fourth embodiment of the present disclosure.

The push units 300 included in the adsorption device 1000 are formed at positions corresponding to the two ends of the adsorbed battery cell C. At this time, the rods 330 included in each push unit 300 are alternately ascended and descended.

Fifth Embodiment

The adsorption device 1000 according to a fifth embodiment of the disclosure includes three push units 300 coupled to the base plate 100, and rods 330 included in one pair of push units 300 and the remaining one push unit 300 are alternately ascended and descended.

FIG. 16 is a bottom perspective view of the adsorption device 1000 according to a fifth embodiment of the present disclosure.

The push units 300 included in the adsorption device 1000 are formed at positions corresponding to both ends and the center of the adsorbed battery cell C, respectively. At this time, the rods 330 included in the push units 300 located at the center of the base plate 100 and the rods 330 included in the pair of push units 300 located at the two ends of the base plate 100 are alternately ascended and descended.

Sixth Embodiment

The adsorption device 1000 according to a sixth embodiment of the disclosure includes one push unit 300 coupled to the base plate 100.

FIG. 17 is a bottom perspective view of the adsorption device 1000 according to a sixth embodiment of the present disclosure.

The push unit 300 included in the adsorption device 1000 is formed at a position corresponding to the center of the adsorbed battery cell C. At this time, the rod 330 included in the push unit 300 located at the center of the base plate 100 is lifted as shown in FIG. 17 to vibrate the center of the battery cell C and shake off the residual battery cell C attached by static electricity.

The adsorption device 1000 of the present disclosure is not limited to the first embodiment to the sixth embodiment above, and can be used by adjusting any number of suction units 200 and push units that adsorb the battery cells C to any position of the base plate 100 as needed.

The adsorption device 1000 of the present disclosure can transmit vibrations to the battery cells C by independently lifting the rods 330 included in each suction unit 200 as the base plate 100 is moved up and down as described above while the battery cells C are adsorbed on the suction units 200, and can shake off the residual battery cells C that are electrostatically attached to the lower surface of the battery cells C by the vibrations of the battery cells C.

The present disclosure has been described in more detail above with reference to the drawings and embodiments. However, it is to be understood that the configurations shown in the drawings or embodiments described herein are only one embodiment of the disclosure and do not represent all of the technical ideas of the disclosure, and that there may be various equivalents and modifications that may replace them at the time of filing the present application.

REFERENCE NUMERALS

20: (PRIOR ART) BASE PLATE
30: (PRIOR ART) SUCTION UNIT
40: (PRIOR ART) CYLINDER UNIT
1000: ADSORPTION DEVICE
100: BASE PLATE
200: SUCTION UNIT
210: NOZZLE
300: PUSH UNIT
310: SPRING MEMBER
320: CYLINDER
320a: TEETH PART
320b: GROOVE PART
321: TOOTH BLADE
321a: INCLINED SURFACE 330: ROD
330a: SUPPORT PART
330b: TEETH FIXING PART
330c: STRIKING PART
331: MOVING BLADE
332: ENGAGING PART
332a: 1ST ENGAGING PART
332b: SECOND ENGAGING PART
333: SPRING FIXING PART
334: SAFETY BAR
340: TOP CAP
350: LOWER CAP
400: MOVING BAR
C: BATTERY CELL

The invention claimed is:

1. An adsorption device for adsorbing battery cells loaded in a loading bin and sequentially removing and transporting the battery cells, comprising:
a base plate arranged to move vertically and horizontally;
a suction unit coupled to the base plate for adsorbing a battery cell located at a lower part of the base plate; and
a push unit coupled to the base plate for striking the battery cell to produce a vibration in the battery cell adsorbed by the suction unit, wherein
the push unit comprises a rod that is lifted up and down and configured to strike a top surface of the adsorbed battery cell to a lower end part thereof, wherein
the rod descends by elastic force of a spring member, wherein
the push unit comprises:
a cylinder coupled to the base plate, and having an open bottom;
the rod inserted into the cylinder to linearly reciprocate along a longitudinal direction of the cylinder; and
the spring member, each end of which is coupled to the cylinder and the rod, respectively, and which pushes the rod downwardly,
the cylinder comprises:
a plurality of teeth parts, each comprising a protruding tooth blade to have a unidirectional slope along a perimeter of an inner side; and
a groove part downwardly recessed between any one pair of teeth parts, and
the rod comprises:
a moving blade protruding from one side of an outer circumferential surface to engage and disengage to the teeth part of the cylinder.

2. The adsorption device of claim 1, wherein
the cylinder comprises a ring-shaped lower cap that is coupled to the lower end part, and
the rod comprises an engaging part protruding along an outer circumferential surface to be engaged to the lower cap.

3. The adsorption device of claim 1, wherein
the rod comprises a spring fixing part protruding along an outer circumferential surface at an upper part thereof to support an end of the spring member.

4. The adsorption device of claim 1, wherein
the teeth part comprise a plurality of tooth blades formed by adhering to each other.

5. The adsorption device of claim 1, wherein
the rod comprises:
a support part that moves within the cylinder;
a striking member extending from the support part and entering a lower part of the cylinder; and
a teeth fixing part comprising the moving blade between the support part and the striking member.

6. The adsorption device of claim 1, wherein
the moving blades are guided by an inclined plane of the tooth blade included in the teeth part of the cylinder.

7. The adsorption device of claim 1, wherein
the base plate is coupled to a single push unit.

8. The adsorption device of claim 7, wherein
the push unit is formed at a location corresponding to the center of the adsorbed battery cell.

9. The adsorption device of claim 1, wherein
the base plate is coupled to a pair of push units and another push unit, and
the rods included in each of the push units alternately ascend and descend.

10. The adsorption device of claim 9, wherein
the base plate is coupled to the pair of push units and the another push unit, and
the rods included in the pair of push units and the other remaining push unit alternately ascend and descend.

11. The adsorption device of claim 1, wherein
the base plate is coupled to two pairs of push units, and
the rods included in each pair of push units alternately ascend and descend.

12. The adsorption device of claim 11, wherein
the push unit is formed at a position corresponding to each end of the adsorbed battery cell.

13. The adsorption device of claim 11, wherein
the push unit is formed at a position corresponding to respective corner part of the adsorbed battery cell.

* * * * *